No. 654,946. Patented July 31, 1900.
V. CERVELLO.
APPARATUS FOR VOLATILIZING DISINFECTANTS.
(Application filed Oct. 27, 1899.)

(No Model.) 2 Sheets—Sheet 1.

Witnesses:
P. T. Iagle.
Henry W. Kennedy.

Inventor
Vincenzo Cervello
By Wiedersheim & Fairbanks
Attorneys

No. 654,946. Patented July 31, 1900.
V. CERVELLO.
APPARATUS FOR VOLATILIZING DISINFECTANTS.
(Application filed Oct. 27, 1899.)

(No Model.) 2 Sheets—Sheet 2.

UNITED STATES PATENT OFFICE.

VINCENZO CERVELLO, OF PALERMO, ITALY.

APPARATUS FOR VOLATILIZING DISINFECTANTS.

SPECIFICATION forming part of Letters Patent No. 654,946, dated July 31, 1900.

Application filed October 27, 1899. Serial No. 734,909. (No model.)

*To all whom it may concern:*

Be it known that I, VINCENZO CERVELLO, professor, a subject of the King of Italy, residing at No. 38 Via Torremezza, Palermo, in the Kingdom of Italy, have invented certain new and useful Improvements in Apparatus for Volatilizing Medicaments, Disinfectants, and the Like, of which the following is a specification.

The apparatus forming the subject of this invention is designed to impregnate the air in living-rooms with vapors in definite proportions of such medicaments, disinfectants, and the like as are capable of volatilizing, either from the solid or from the liquid state, at a temperature not exceeding 100° centigrade. The capability of the apparatus to impregnate to any desired degree is due to the medicaments being volatilized by contact with a surface heated by steam at atmospheric pressure—that is, at a practically constant temperature—so that a definite quantity of a certain medicament develops a definite amount of vapor within a certain definite time. If the cubical capacity of a room has been ascertained, it will be an easy matter by the aid of this apparatus to distribute exactly the quantity required of the volatilized medicament. Furthermore, the operation of the apparatus is such as to enable it to work for several hours without any attention to it, providing means are provided for returning the steam which heats the walls of the apparatus in a condensed form without allowing the condensation-water to come into contact with the medicaments requiring to be volatilized.

Figure 1:
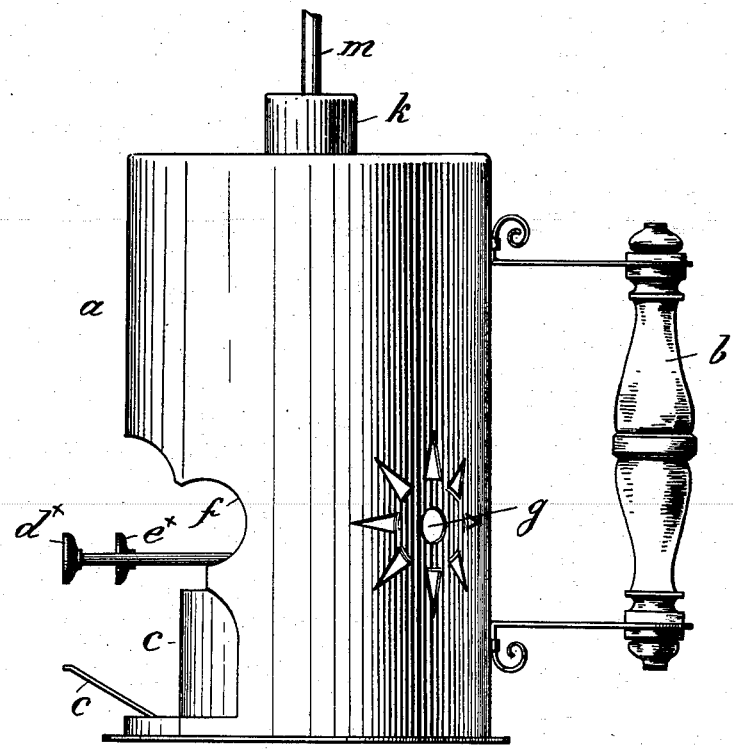
Figure 2:
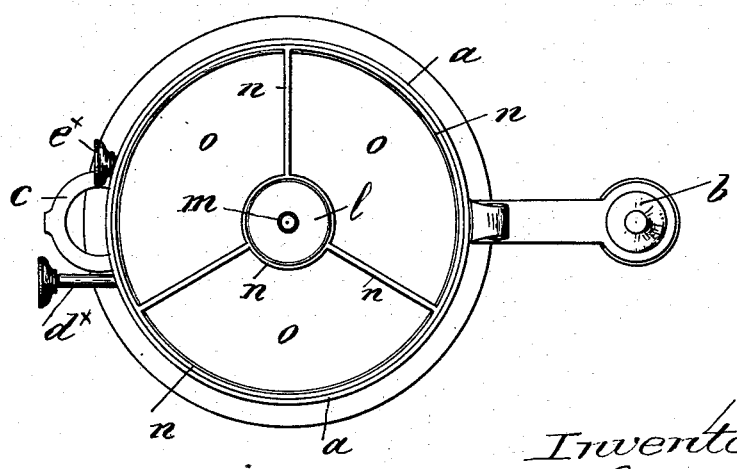
Figure 3:
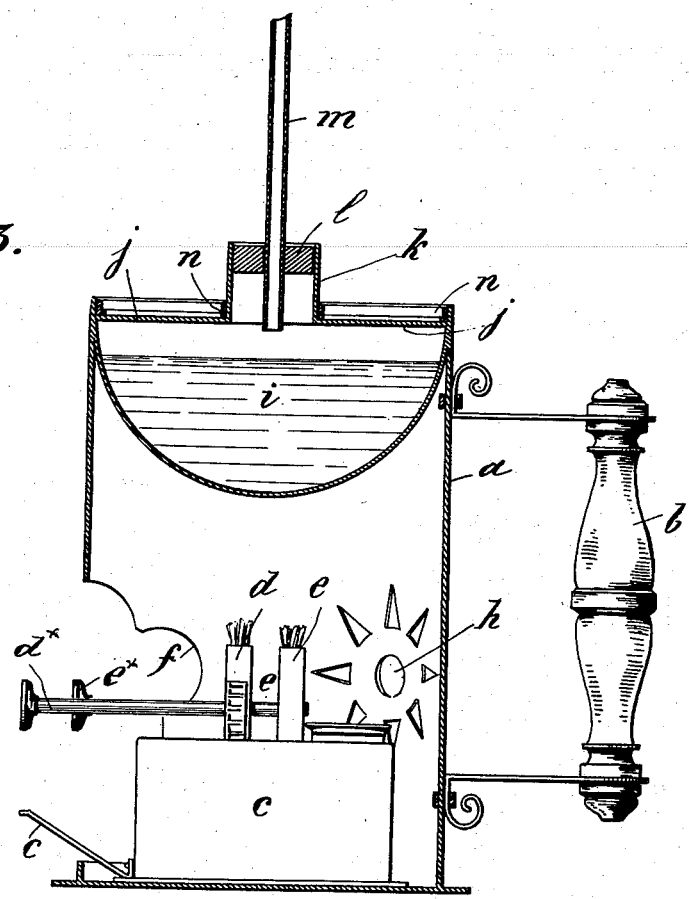

Referring to the accompanying drawings, Figure 1 shows a side elevation of one form of my apparatus. Fig. 2 is a plan thereof, and Fig. 3 is a longitudinal vertical section of the apparatus.

The casing $a$, provided with a handle $b$, is formed with air-holes $g$ $h$, and with a front opening $f$ for the introduction of the spirit-lamp $c$. The lamp is arranged to burn for several hours and has two wicks or a duplex burner $d$ and $e$, operated by spindles $d^x$ and $e^x$ and rack and pinion wheels.

The upper portion of the casing $a$ contains the water-boiler $i$, having a flat top plate $j$, which is heated from below. The top plate $j$ is formed with a centrally-arranged dome $k$, closed at top by a rubber stopper $l$. Through the said stopper a thin glass pipe $m$ is introduced, the lower end of which never dips into the water of the boiler $i$ and which extends upward so far (to sixty centimeters and more) as to cause, as before mentioned, the steam to condense inside this pipe, and finally return into the boiler without wetting the outside of the pipe $m$. The substance or substances to be vaporized is or are placed upon the plate $j$ and is or are distributed in the various sectors $o$, surrounding the dome $k$ and limited by the spider-ring $n$.

The apparatus is used in the following manner: First, the boiler is filled with water to about eight to nine tenths of its capacity, whereupon the stopper $l$ is inserted into the opening of the dome $k$, taking care that the lower end of the pipe $m$ does not descend into the water. Then the ring $n$ is placed around the dome $k$, and the proper quantity of the substance or substances for volatization is or are distributed over the plate $j$, within the sectors of the ring $n$. The two wicks $d$ and $e$ are then lighted and allowed to burn until the water is brought to boiling, after which one of the flames is extinguished and the other lowered so far as to keep the water just boiling until the substance or substances are completely volatilized.

I claim—

1. In an apparatus of the character described, a casing, heating means, a boiler with a dome above the same, means for supporting the medicament above the boiler, and a vertical pipe extending through the dome and into the boiler independent of the medicament and to a distance above the same to condense the steam within the pipe and to prevent the same from commingling with the volatilized medicament.

2. In an apparatus for the purpose described, a casing, heating means, a boiler, a dome extending upward therefrom, a sealing device for the upper end of the dome, means for supporting a medicament above the boiler and around the dome independent of the medicament and its holder, and a long vertical pipe extending into the boiler and upward through the dome to condense the steam in said pipe and keep it from contact with the volatilized medicament.

3. A device for the purpose described, consisting of a casing, a boiler, heating means, a dome, a sector spider-ring above the boiler and surrounding the dome, and a vertical pipe extending through the dome into the boiler and entirely independent of the medicament and extended upward a distance sufficient to condense the steam within the pipe and return it to the boiler without wetting the exterior of the said pipe.

In testimony whereof I have hereunto set my hand, in presence of two subscribing witnesses, this 19th day of September, 1899.

VINCENZO CERVELLO.

Witnesses:
GIOVANNI MUCOLI,
CARLO TRUSO.